(12) United States Patent
Lotfi et al.

(10) Patent No.: US 9,057,279 B2
(45) Date of Patent: Jun. 16, 2015

(54) LABYRINTH SEALS

(75) Inventors: Osama Lotfi, Rugby (GB); Christophe Simonet, Ennetbaden (CH); Niall Macdonald, Ullesthorpe (GB)

(73) Assignee: ALSTOM TECHNOLOGY LTD, Baden (CH)

( * ) Notice: Subject to any disclaimer, the term of this patent is extended or adjusted under 35 U.S.C. 154(b) by 397 days.

(21) Appl. No.: 13/538,402

(22) Filed: Jun. 29, 2012

(65) Prior Publication Data
US 2013/0149118 A1 Jun. 13, 2013

(30) Foreign Application Priority Data

Jul. 4, 2011 (GB) .................................. 1111287.7

(51) Int. Cl.
F01D 11/02 (2006.01)
F01D 11/08 (2006.01)
F16J 15/447 (2006.01)
F01D 5/22 (2006.01)

(52) U.S. Cl.
CPC ................ *F01D 11/02* (2013.01); *F01D 11/08* (2013.01); *F16J 15/4472* (2013.01); *F01D 5/225* (2013.01)

(58) Field of Classification Search
None
See application file for complete search history.

(56) References Cited

U.S. PATENT DOCUMENTS

| 3,940,153 | A | 2/1976 | Stocker |
| 4,046,388 | A | 9/1977 | Meyer |
| 5,029,876 | A | 7/1991 | Orlando et al. |
| 5,328,326 | A | 7/1994 | Gros et al. |
| 6,962,342 | B2 | 11/2005 | Wieghardt |
| 7,445,213 | B1 * | 11/2008 | Pelfrey ........................... 277/418 |
| 8,561,997 | B2 * | 10/2013 | Bhagavatheeswaran et al. ............................. 277/411 |
| 8,591,181 | B2 * | 11/2013 | Kasibhotla et al. ........ 415/174.5 |
| 2006/0228209 | A1 * | 10/2006 | Couture et al. ............. 415/174.2 |
| 2008/0050233 | A1 * | 2/2008 | Steiger et al. ................. 415/230 |
| 2009/0297341 | A1 | 12/2009 | Turnquist et al. |
| 2011/0156359 | A1 | 6/2011 | Zheng et al. |
| 2011/0280715 | A1 * | 11/2011 | Garg et al. ................. 415/174.5 |

FOREIGN PATENT DOCUMENTS

| CN | 1070029 A | 3/1993 |
| EP | 1001139 A1 | 5/2000 |

(Continued)

OTHER PUBLICATIONS

Office Action issued on Aug. 26, 2014, by the State Intellectual Property Office of People's Republic China in corresponding Chinese Patent Application No. 201210336232.5, and an English Translation of the Office Action. (21 pages).

(Continued)

*Primary Examiner* — Dwayne J White
*Assistant Examiner* — Justin Seabe
(74) *Attorney, Agent, or Firm* — Buchanan Ingersoll & Rooney PC

(57) ABSTRACT

A labyrinth seal impedes leakage flow though a gap between confronting static and moving parts in a turbomachine. The seal includes axially spaced and circumferentially extending sealing fins arranged in leakage flow series and projecting across the gap from at least one of the confronting parts into sealing proximity with the opposing confronting part. The fins have at least a distal portion that is curved or inclined in the upstream direction of the leakage flow to deflect the leakage flow in the upstream direction. Successive fins define chambers that accommodate recirculating vortices produced by the deflected leakage flow.

17 Claims, 2 Drawing Sheets

(56) References Cited

FOREIGN PATENT DOCUMENTS

| | | | |
|---|---|---|---|
| EP | 1152124 | A1 | 11/2001 |
| GB | 2131100 | A | 6/1984 |
| GB | 2477736 | A | 8/2000 |
| JP | 52-109066 | A | 9/1977 |
| JP | 59-105904 | A | 6/1984 |
| JP | 59-105905 | A | 6/1984 |
| JP | 2-245581 | A | 10/1990 |
| JP | 5-149444 | A | 6/1993 |
| JP | 2001-200937 | A | 7/2001 |
| JP | 2006132635 | A | 5/2006 |
| JP | 2009-293617 | A | 12/2009 |
| JP | 2011-117455 | A | 6/2011 |

OTHER PUBLICATIONS

Office Action issued on May 19, 2014, by the Japanese Patent Office in corresponding Japanese Patent Application No. 2012-149181. (7 pages).

\* cited by examiner

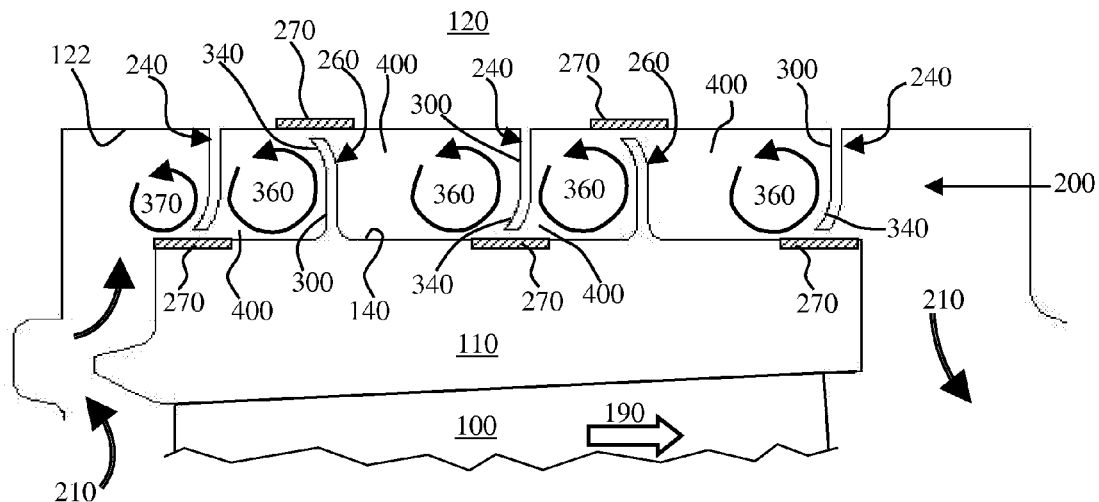
*Figure 5*
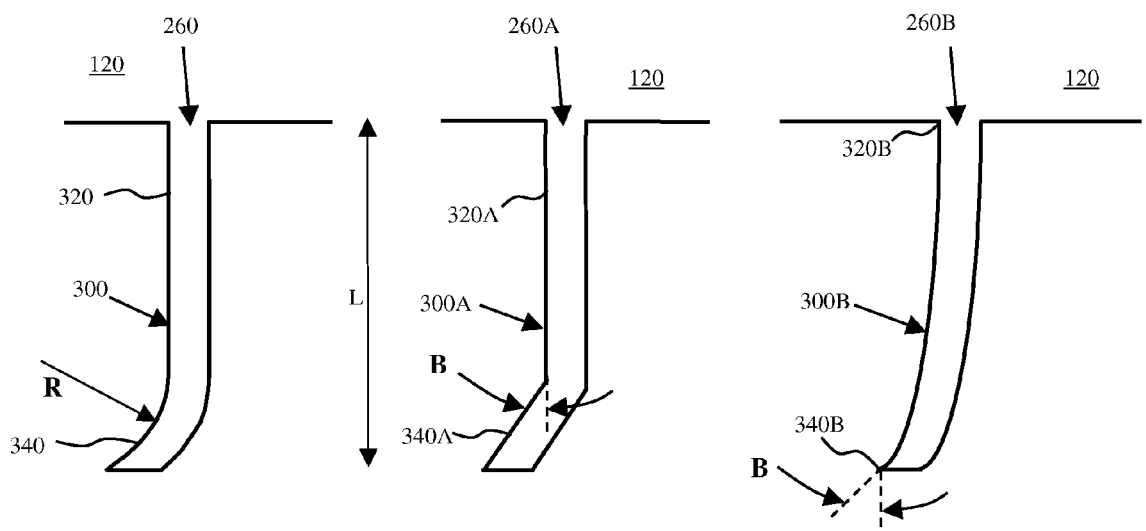
*Figure 6*   *Figure 7*   *Figure 8*

LABYRINTH SEALS

RELATED APPLICATIONS

The present application hereby claims priority under 35 U.S.C. Section 119 to Great Britain Patent application number 1111287.7, filed Jul. 4, 2011, the entire contents of which are hereby incorporated by reference.

FIELD OF THE INVENTION

The present invention relates generally to labyrinth seals, and particularly to labyrinth seals for sealing between static and moving parts in turbomachines, such as axial flow gas turbines, steam turbines, or compressors.

BACKGROUND

Labyrinth seals are commonly used to provide a seal, and therefore minimize fluid leakage, between static and rotating parts in turbomachines, such as axial flow gas turbines or steam turbines.

A conventional labyrinth seal for sealing between the tips of moving blades and the radially adjacent static casing in an axial flow turbine is illustrated in FIG. 1 of EP 1001139 A1. In this conventional labyrinth seal, axially spaced and circumferentially extending sealing fins are caulked into the static casing and project radially inwardly, across the fluid flow path, towards castellated arcuate blade shrouds at the blade tips. A radial clearance is normally provided between the tip of each sealing fin and the radially adjacent arcuate blade shrouds to prevent or minimize rubbing contact between the tips of the static sealing fins and the moving blade shrouds during radial excursions of the moving blade shrouds relative to the radially adjacent static casing.

In conventional labyrinth seals such as that shown in FIG. 1 of EP 1001139 A1, axially flowing working fluid can escape through the radial clearances provided between the tips of the sealing fins and the radially adjacent arcuate blade shrouds, thus reducing the effectiveness of the labyrinth seal.

It is, therefore, desirable to provide labyrinth seals with improved sealing capability.

SUMMARY

The present disclosure is directed to a labyrinth seal arranged to impede leakage flow though a gap between confronting surfaces of static and moving parts in an axial fluid flow turbomachine. The labyrinth seal includes a plurality of axially spaced and circumferentially extending sealing fins arranged in leakage flow series, the fins projecting across the gap from at least one of the confronting parts towards an opposing confronting part such that distal ends of the fins are in sealing proximity to the opposing confronting part. The labyrinth seal also includes a plurality of chambers defined by successive fins in leakage flow series. Each fin has an upstream-facing surface of which at least a distal portion thereof is inclined towards the upstream direction of the leakage flow to form a vortex-producing flow recirculation surface operative to deflect the leakage flow in the upstream direction and create recirculating vortices in the leakage flow within the chambers defined by successive fins.

BRIEF DESCRIPTION OF THE DRAWINGS

Embodiments of the present invention will now be described by way of example only and with reference to the accompanying drawings, in which:

FIG. 5 is a view similar to FIG. 1, but showing a second major embodiment of a labyrinth seal;

FIG. 6 is an enlarged view of a fin forming part of FIG. 5; and

FIGS. 7 and 8 are views similar to FIG. 6, but showing two possible variants of the shape of the fin of FIG. 6.

Figure 1:
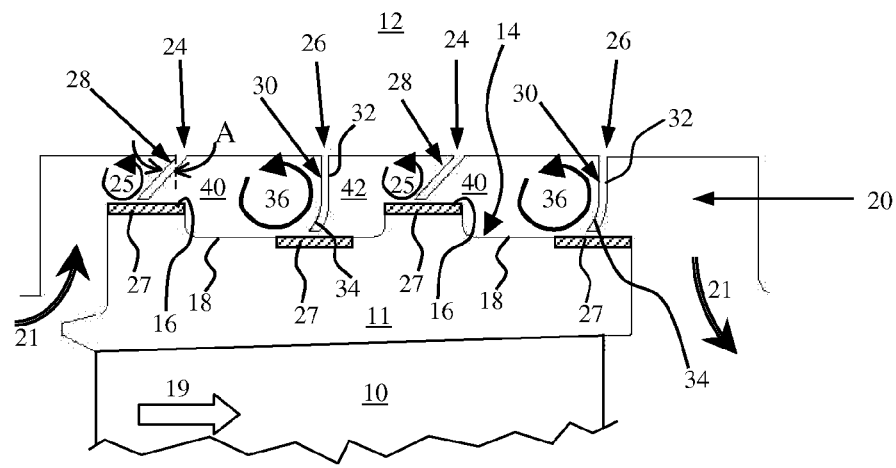
FIG. 1 is a diagrammatic cross-sectional view of a first major embodiment of a labyrinth seal viewed in the circumferential direction of an axial flow turbine in which it is installed.

DETAILED DESCRIPTION OF THE PREFERRED EMBODIMENTS Introduction

The present disclosure provides a labyrinth seal arranged to impede leakage flow though an annular gap between confronting surfaces of static and moving parts in an axial fluid flow turbomachine, the labyrinth seal comprising:

a plurality of axially spaced and circumferentially extending sealing fins arranged in leakage flow series, the fins projecting across the gap from at least one of the confronting parts towards an opposing confronting part such that distal ends of the fins are in sealing proximity to the opposing confronting part;

a plurality of chambers defined between successive fins in leakage flow series;

each fin having an upstream-facing surface of which at least a distal portion thereof is inclined towards the upstream direction of the leakage flow to form a vortex-producing flow recirculation surface operative to deflect the leakage flow in the upstream direction and create recirculating vortices in the leakage flow within the chambers defined by successive fins.

As used herein, the term "distal end" means the end of the fin that is most distant from the surface from which the fin projects and the term "distal portion" means a part of the fin, including the fin's distal end, that is most distant from the surface from which the fin projects. Use of the term "sealing proximity" means that there is a small radial clearance between the distal end of a sealing fin and the surface against which it seals, such clearance being insufficient to seriously compromise the sealing efficiency of the labyrinth seal.

The flow recirculation surfaces of the circumferentially extending sealing fins divert and recirculate fluid that is flowing downstream along the fluid leakage path, back in an upstream direction. This reduces leakage flow through the radial clearances between the distal ends of the sealing fins and the surface of the radially adjacent static or moving part of the turbomachine and results in a reduced effective leakage area and hence a reduced discharge coefficient. A fluid recirculation zone is created between axially adjacent sealing fins and the flow recirculation surface of the downstream sealing fin generates a vortex flow within the fluid recirculation zone. The generated vortex flow increases the pressure drop across the sealing fins and thereby reduces leakage through the radial clearances between the tips of the sealing fins and the surface of the radially adjacent static or moving part of the turbomachine. The reduced leakage flow increases the sealing effectiveness of the labyrinth seal.

In one major embodiment disclosed herein, one of the confronting surfaces of the static and moving parts is castellated and comprises at least one land and at least one relatively recessed portion, each land and each recessed portion being in sealing proximity to the distal end of a sealing fin and wherein successive sealing fins alternately comprise a first fin having a straight upstream-facing surface inclined towards the upstream direction and a second fin having an upstream-facing surface of which at least the distal portion is inclined towards the upstream direction.

Note that the terms "first fin" and "second fin" used herein are intended to identify the sealing fins, not to restrict whether they are arranged first or second in fluid flow sequence.

To obtain disruption and recirculation of the leakage flow, the upstream-facing surface of the/each first sealing fin may be inclined in the upstream direction at an acute angle of between 10 and 70 degrees, preferably 45 degrees, away from the radial direction.

Preferably, the distal end of each first fin is in sealing proximity to a land and the distal end of each second fin is in sealing proximity to a recessed portion.

Alternate lands and recessed portions are provided in one of the confronting surfaces so that the leakage flow has a less direct route through the labyrinth seal than would be the case if the surface were merely planar, thereby increasing the resistance of the labyrinth seal to the leakage flow. Additionally, the recessed portions provide the recirculating vortices with a greater radial height and chamber volume in which to fully develop, thereby provide maximum recirculation of any leakage flow and further increasing the flow resistance of the labyrinth seal.

The flow recirculation surface formed by the inclined distal portion of the/each second fin may be a concavely curved portion of the second fin's upstream-facing surface.

In one preferred variant of the labyrinth seal, the most upstream fin is a first fin whose distal end is in sealing proximity to a land, and the immediately succeeding fin is a second fin whose distal end is in sealing proximity to a recessed surface portion. In an alternative arrangement, the most upstream fin is a second fin whose distal end is in sealing proximity to a recessed surface portion and the immediately succeeding fin is a first fin whose distal end is in sealing proximity to a land.

In further alternative embodiments, the or each of the first sealing fins may project from the static or moving part across the fluid flow path into a corresponding recessed portion of a confronting moving or static surface, and the or each of the second circumferentially extending sealing fins may project from the static or moving part across the fluid flow path towards a corresponding land.

For ease of manufacture, the upstream-facing surface of each second fin preferably comprises a radially extending portion projecting from the static or moving part and an inclined distal portion adjacent the fin's distal end. The distal portion of the upstream-facing surface of each second fin may be inclined over a distance in the range of about 20% to about 50%, preferably about 30%, of the length of the fin.

In an alternative configuration, which may yield superior sealing performance, but which may be more difficult or expensive to manufacture, the upstream-facing surface of the or each second fin is concavely curved over its whole length, maximum concavity being at its distal end.

In a preferred arrangement, the first and second sealing fins are provided on the static part and the castellated surface is provided on the moving part. Alternatively, the first and second sealing fins may be provided on the moving part and the castellated surface may be provided on the static part, so that the first and second sealing fins project across the fluid flow path from the moving part towards the castellated surface on the static part.

In a second major embodiment, successive sealing fins alternately comprise a static fin projecting from the static part into sealing proximity with the moving part and a moving fin projecting from the moving part into sealing proximity with the static part. Preferably, the most upstream fin in the labyrinth seal is a static fin. Alternatively, the most upstream fin in the labyrinth seal may be a moving fin.

In one variant, the upstream-facing surfaces of the static and moving sealing fins comprise radially extending portions projecting from the static and moving parts, respectively, and inclined distal portions adjacent the distal ends of the fins. For example, the distal portions of the upstream-facing surfaces of the fins may be inclined over a distance in the range of about 20% to about 50%, preferably 30%, of the lengths of the fins.

Preferably, the inclined distal portions of the static and moving sealing fins comprise concavely curved portions of the upstream-facing surfaces, but alternatively the upstream-facing surfaces of the sealing fins may be concavely curved over their whole lengths, maximum concavity being at their distal ends.

To prevent or ameliorate damage to the distal ends of the sealing fins in both the above major embodiments, due to excessive radial excursions of the moving shroud ring relative to the static casing, abradable material may be provided on the surfaces of the moving and/or static parts, as appropriate, adjacent the distal ends of the sealing fins. In the event of excessive radial excursions of the moving part relative to the static part during operation of the axial flow turbomachine, the distal ends of the sealing fins will rub against the abradable material rather than the solid metal of the static or moving part. Since it is arranged that the abradable material is softer or at least wears away more easily than the material at the distal ends of the sealing fins, the shape and sealing effectiveness of the fins is preserved.

A further aspect of the invention provides a turbomachine, comprising a static part, a moving part and a labyrinth seal according to the first or second major embodiments for sealing between the static and moving parts.

The turbomachine may be an axial flow turbine, such as a steam turbine or a gas turbine. In particular, the moving part may be a moving arcuate blade shroud mounted on the radially outer tip of a moving turbine blade. The static part may be a static casing positioned radially outwardly of the moving blade shroud. Alternatively, the moving part may be a rotor shaft and the static part may be a static diaphragm ring positioned radially outwardly of the rotor shaft. The labyrinth seal may thus be arranged to seal between an inner diameter of the static diaphragm ring and the radially inner rotor.

DETAILED DESCRIPTION

An axial flow turbine, such as a gas turbine or steam turbine, generally includes a plurality of turbine stages, each stage comprising an annular array of angularly spaced-apart moving blades, preceded by an annular array of angularly spaced-apart static vanes whose function is to guide the turbine working fluid onto the moving blades.

Referring to FIG. 1, there is shown the radially outer part of a moving blade comprising an aerofoil portion 10 and an arcuate blade shroud 11, which is mounted on and integral with the radially outer tip of the aerofoil portion 10. Adjacent blade shrouds 11 cooperate to form an annular shroud ring. A circumferentially extending static casing 12 is positioned radially outwardly of, and surrounds, the moving blades.

In the particular embodiment of FIG. 1, each blade shroud 11 has a radially outer castellated surface 14 formed by a plurality of axially spaced-apart, radially outer, circumferentially extending lands 16, each land 16 being followed by a relatively recessed, radially inner surface portion 18 that is circumferentially co-extensive with the land. Although FIG. 1 shows a shroud surface with two lands 16, it is at the option of the skilled person to incorporate as many lands as may be convenient and useful in the particular circumstances of the turbine design being considered. Normally, however, there will be a plurality of lands 16 in order to decrease leakage of working fluid through the gap between the shroud 11 and the static casing 12, as hereafter explained.

Working fluid is expanded through the axial flow turbine and moves along a fluid flow path between the moving blade aerofoils 10 in a downstream direction, as shown by arrow 19 in FIG. 1. A labyrinth seal 20 seals between the moving blade shrouds 11 and the radially adjacent static casing 12 to minimize fluid leakage 21 past the blade shrouds 11 at the tips of the moving blades.

In the particular embodiment of FIG. 1, the labyrinth seal 20 includes a plurality of first circumferentially extending and axially spaced sealing fins 24 which project radially inwardly from the static casing 12 across the leakage fluid flow path towards the lands 16 on the castellated surface 14 of the moving blade shrouds 11. The labyrinth seal 20 also includes a plurality of second circumferentially extending and axially spaced sealing fins 26 which likewise project radially inwardly from the static casing 12 across the leakage fluid flow path towards the relatively recessed radially inner portions 18 of the castellated surface 14 of the moving blade shrouds 11.

The first and second circumferentially extending sealing fins 24, 26 are alternately arranged along the static casing 12 in the axial direction, such that each of the first sealing fins 24 is followed by a second sealing fin 26. The first and second circumferentially extending sealing fins 24, 26 may be manufactured as separate components and secured, e.g., by a caulking process, as known per se, in circumferentially extending recesses (not shown) in the static casing 12. Alternatively, it may be possible to produce the fins integrally with the casing by a machining or casting process.

The distal ends or tips of each of the first and second sealing fins 24, 26 are in sealing proximity to the castellated surface 14 of the moving blade shrouds 11, that is, during normal operation of the turbine, there are small radial clearances between the distal ends of the fins and the castellated surface 14. Such radial clearances may be of the order of one or two millimeters and are intended to prevent or ameliorate rubbing contact between the tips of the sealing fins 24, 26 and the adjacent solid metal of the blade shrouds 11 caused by small radial excursions of the moving blade shrouds 11 relative to the static casing 12 during operation of the turbine. Such rubbing contact would cause the tips of the sealing fins 24, 26 to wear, and hence deform, thus reducing the sealing effectiveness of the labyrinth seal 20. The correct radial clearances to use can be calculated by computer modeling of the operating behavior of the turbine or determined by rig tests.

Although the radial clearances chosen are generally sufficient to prevent rubbing contact between the tips of the first and second sealing fins 24, 26 and the castellated surface 14 of the adjacent moving blade shrouds 11 during most radial excursions of the moving blade shrouds 11 relative to the static casing 12, larger radial excursions, which may be outside normal turbine operating behavior, can be tolerated by providing abradable material 27 on the castellated surface 14 of the blade shrouds 11 adjacent the tips of the first and second sealing fins 24, 26. The abradable material 27, which is softer than the material at the tips of the sealing fins 24, 26, is worn away by the tips of the sealing fins 24, 26 during radial excursions of the moving blade shrouds 11. Damage to the tips of the sealing fins 24, 26 is, thus, prevented or at least minimized, thereby preserving the shape of the tips of the first and second sealing fins 24, 26 and hence the sealing effectiveness of the sealing fins 24, 26.

Abradable materials suitable for the above purpose are, for example, thermal-sprayed coatings of various types, such as cermets. A well-known alternative is Feltmetal®, comprising metal fiber felts made from a variety of high temperature resistant alloys, the fibers in the felts being randomly interlocked by a sintering process. Feltmetal® is manufactured by Technetics, 1700 E. Int'l Speedway Blvd., DeLand, Fla. 32724 USA.

Each of the first sealing fins 24 is inclined in an upstream direction and defines an acute angle 'A' relative to the radial direction. In the present case angle A is about 45 degrees away from the radial direction, but in other embodiments angle A may vary between about 10 and 70 degrees. Accordingly, each of the first sealing fins 24 has a linear (i.e. non-curved) upstream-facing surface 28 which is oriented at the acute angle A, in the aforesaid range. Each of the first sealing fins 24 is mounted on the static casing 12 and projects across the leakage flow path so that its distal end is in sealing proximity with a corresponding circumferential land 16 of the castellated surface 14 of the moving blade shrouds 11. The inclined linear upstream-facing surface 28 of each of the first sealing fins 24 cooperates with the corresponding circumferentially extending land 16 and forms a vortex-producing flow recirculation surface operative to deflect leakage flow 21 back in an upstream direction, thereby creating recirculating vortices 25 in the leakage flow. Leakage flow 21 past the tips of the first sealing fins 24 is thus reduced.

Figures 2, 3, 4:
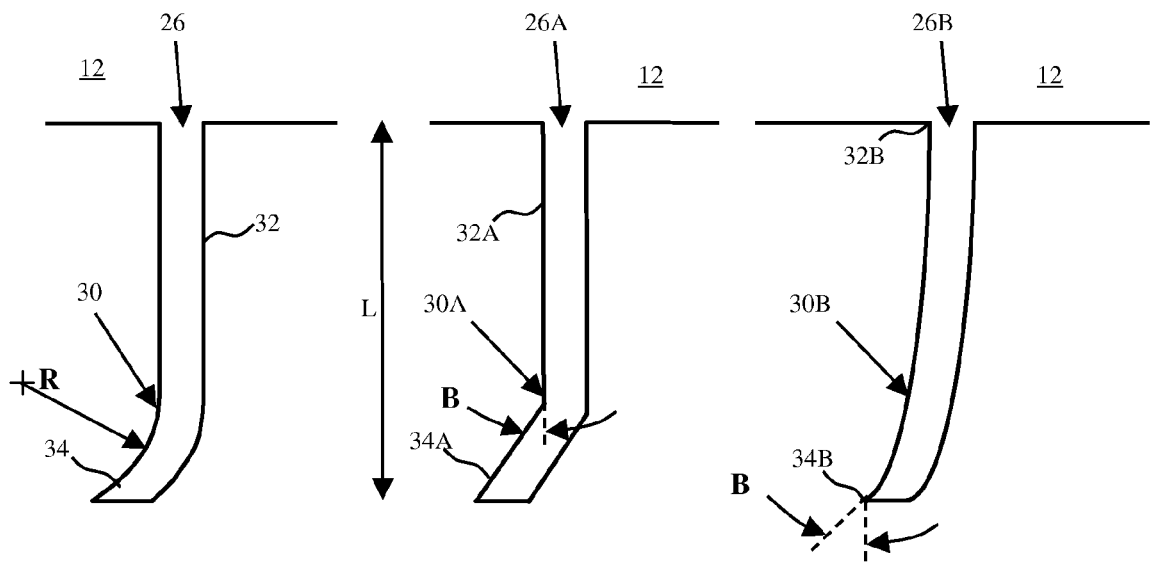
FIG. 2 is an enlarged view of a fin forming part of FIG. 1.
FIGS. 3 and 4 are views similar to FIG. 2, but showing two possible variants of the shape of the fin of FIG. 2.

Referring also to FIG. 2, each of the second sealing fins 26 includes an upstream-facing surface 30, comprising a first fin portion 32 which projects in a substantially radially inward direction from the static casing 12 across the leakage flow path, and a second, distal portion 34 adjacent to and including the fin's tip, this distal portion being inclined towards the upstream direction, i.e., towards the downstream surface of an immediately upstream sealing fin, where such a fin is present. In the embodiment illustrated in FIGS. 1 and 2, the inclined distal portion 34 of each second fin 26 is a concavely curved portion of the upstream-facing surface 30. This concavely curved portion forms a vortex-producing flow recirculation surface, which extends over a distance comprising about 30% of the total length L of the fin 26 measured between its tip and the surface from which it projects. In other embodiments the curvature may extend over a distance in the range of about 20% to about 50% of the fin's length between its tip and the static casing surface 12 from which it projects.

As an example, consider a fin with a length L of 10 mm between its point of attachment to the surface 12 and its tip. If the curve in the distal portion of the upstream-facing surface 30 of the fin has a radius R of 4 mm, the curve will occupy about the last 3 mm of the fin adjacent the tip, measured in the radial direction.

Whereas the concavely curved distal portion 34 of upstream-facing surface 30 of fins 26 is shown as an arc of a circle, the skilled person will realize that the curve could alternatively be an arc of an ellipse or other conic section.

The concavely curved distal portion 34 of upstream-facing surface 30 of fins 26 may be approximated by a straight (linear) distal portion, inclined at an angle relative to the radial direction. This is illustrated in FIG. 3, where a fin 26A of length L has an upstream-facing surface 30A with a straight distal portion 34A that is inclined at an angle 'B' to the radial direction to form a vortex-producing flow recirculation surface. Similarly to the curved distal portion 34 in FIG. 2, distal portion 34A in FIG. 3 is inclined over a distance comprising about 30% of the total length L of the fin 26 measured between its tip and the surface from which it projects, but in other embodiments the inclined portion may extend over a distance comprising between about 20% and about 50% of the fin's length between its tip and the surface from which it projects.

As an example, angle B in FIG. 3 may be in the range of about 10 degrees to about 60 degrees, preferably about 25 degrees to about 45 degrees, and if the length L of the fin is 10 mm, the inclined distal portion 34A of the upstream-facing surface 30A may occupy about the last 3 to 4 mm of the fin adjacent the tip, measured in the radial direction FIG. 4 illustrates a further alternative embodiment, which may be preferred from the aspect of enabling greater sealing efficiency. In this embodiment, the whole of the upstream-facing surface 30B of the fin 26B is curved in the upstream direction, not merely the distal portion. In the particular case shown, the angle that the upstream-facing surface 30B makes to the radial direction gradually increases from zero at a point where the fin projects from the static or moving surface, to a maximum angle B at the tip 340B of the fin. For example, the surface 300B could be elliptically, parabolically or hyperbolically curved. Again, angle B may be in the range of about 10 degrees to about 60 degrees, preferably about 25 degrees to about 45 degrees.

Returning to a consideration of FIGS. 1 and 2, the shapes of the fins 26, 28 deflect leakage fluid 21 back in an upstream direction, thus creating recirculating vortex flows 25, 36 in the axially and circumferentially extending chambers 40, 42 defined between successive fins. The vortices make it difficult for the leakage flow to exit through the gaps between the tips of the fins and the adjacent moving surfaces, resulting in a reduced effective area and therefore a smaller coefficient of fluid discharge through the gaps. Furthermore the generated vortices contribute to a larger pressure drop across the fins and therefore reduced leakage. Leakage flow past the tips of the fins is thus reduced.

As the number of first and second circumferentially extending sealing fins 24, 26 increases, the disruption and recirculation of the leakage fluid flowing along the fluid flow path also increases. The disruption of the leakage flow that is provided by the arrangement of the first and second circumferentially extending sealing fins 24, 26 of the labyrinth seal illustrated in FIG. 2 has been found to provide a reduction in leakage flow between the castellated surface 14 of the moving blade shrouds 11 and the static casing 12 of about 19% compared to conventional labyrinth seal designs such as that shown in FIG. 1 of EP 1001139 A1. The efficiency of an axial flow turbine including the labyrinth seal is thus appreciably improved.

It should be noted that the shroud surface 14 is provided with alternate lands 16 and recessed portions 18 so that the leakage flow 21 has a less direct route through the labyrinth seal than would be the case if the shroud surface were merely planar. This increases the resistance of the labyrinth seal to the leakage flow. Moreover, the recessed portions 18 provide vortices 36 with a greater radial height and chamber volume in which to fully develop, thereby further increasing resistance of the labyrinth seal to the leakage flow.

Although various embodiments have been described in the preceding paragraphs, it should be understood that various modifications may be made to those embodiments without departing from the scope of the following claims.

For example, the first and/or second circumferentially extending sealing fins 24, 26 could be mounted on the moving blade shrouds 11 for rotation therewith. In this case, the radially inner surface of the static casing 12 would be castellated so that the first and second circumferentially extending sealing fins 24, 26 project radially outwardly from the blade shrouds 11, across the fluid flow path, towards the castellated surface 14 of the static casing 12.

Although FIG. 1 shows four sealing fins arranged in flow series, i.e., two first fins 24, each of which is followed by a second fin 26, it should be realized that if desired, this sequence could be extended indefinitely, e.g., six sealing fins comprising three first fins 24, each of which is followed by a second fin 26. Conversely, in some situations, it may be possible to achieve acceptable sealing performance using two first fins 24, with one second fin 26 located between the two fins 24, or even only one first fin 24 followed by only one second fin 26.

Whereas FIG. 1 illustrates a presently preferred arrangement, in which the most upstream fin is a first fin 24 whose distal end is in sealing proximity to a land 16, and the immediately succeeding fin is a second fin 26 whose distal end is in sealing proximity to a recessed surface portion 18, it may also be possible to obtain a desirable increase in efficiency if the order of the first and second fins is reversed, so that the most upstream fin is a second fin 26 whose distal end is in sealing proximity to a recessed surface portion 18 and the immediately succeeding fin is a first fin 24 whose distal end is in sealing proximity to a land 16.

A second major embodiment will now be described with reference to FIGS. 5 to 8.

FIG. 5 again shows the radially outer part of a moving blade comprising an aerofoil portion 100 and an arcuate blade shroud 110, which is mounted on and integral with the radially outer tip of the aerofoil portion 100. Adjacent blade shrouds 110 cooperate to form an annular shroud ring. A circumferentially extending static casing 120 is positioned radially outwardly of, and surrounds, the moving blades.

Working fluid is expanded through the axial flow turbine and moves along a fluid flow path between the moving blade airfoils 100 in a downstream direction, as shown by arrow 190 in FIG. 1. A labyrinth seal 200 seals between the moving blade shrouds 110 and the radially adjacent static casing 120 to minimize fluid leakage 210 past the blade shrouds 110 at the tips of the moving blades.

In the particular embodiment of FIG. 5, the labyrinth seal 200 includes a plurality of first circumferentially extending and axially spaced sealing fins 240 which extend radially inwardly from the surface 122 of the static casing 120 across the leakage fluid flow path towards the surface 140 of the moving blade shrouds 110. The labyrinth seal 200 also includes a plurality of second circumferentially extending and axially spaced sealing fins 260 which project radially outwards from the surface 140 of the moving blade shrouds 110 across the leakage fluid flow path towards the surface 122 of the static casing 120. Hence, the first sealing fins 240, projecting inwardly from the static casing 120, may be termed static sealing fins, and the second sealing fins 260, projecting outwardly from the moving blade shrouds 110 may be termed moving sealing fins.

The static and moving sealing fins 240, 260 are alternately arranged in the axial direction through the labyrinth seal 200, such that each static sealing fin 240 is followed by a moving sealing fin 260. Thus, the static sealing fins 240 project into axial spaces between the moving sealing fins 260, whilst the moving sealing fins 260 project into axial spaces between the static sealing fins. The static and moving sealing fins 240, 260 may be manufactured as separate components and secured, e.g., by a caulking process, as known per se, in circumferentially extending recesses (not shown) in the static casing 120 and the moving blade shrouds 110, respectively. Alternatively, it may be possible to produce the fins integrally with the shrouds 110 and/or the casing 120 by a machining or casting process.

The distal ends or tips of the static sealing fins 240 are in sealing proximity to the moving blade shrouds 110, whilst the distal ends or tips of the moving sealing fins 260 are in sealing proximity to the static casing 120. This means that during normal operation of the turbine, there are small radial clearances between the distal ends of the static fins 240 and the moving blade shrouds 110, and between the distal ends of the moving fins 260 and the static casing 120. Such radial clearances are intended to prevent or ameliorate rubbing contact between the distal ends of the sealing fins 240, 260 and the adjacent solid metal of the moving blade shrouds 110 or static casing 120, caused by radial excursions of the moving blade shrouds 110 relative to the static casing 120 during operation of the turbine. Such rubbing contact would cause the tips of the sealing fins 240, 260 to deform, thus reducing the sealing effectiveness of the labyrinth seal 200. The correct radial clearances to use can be calculated by computer modeling of the operating behavior of the turbine, and/or determined by rig tests.

Although the radial clearances chosen are generally sufficient to prevent rubbing contact between the tips of the static and moving sealing fins 240, 260 and the adjacent moving blade shrouds 110 or static casing 120 during most radial excursions of the moving blade shrouds 110 relative to the static casing 120, larger radial excursions, which may be outside normal turbine operating behavior, can be tolerated by providing abradable material 270 on or in the surfaces 140, 122 of the moving blade shrouds 110 and the static casing 120 adjacent the tips of the static sealing fins 240 and the moving sealing fins 260. The abradable material 270, which is softer than the material at the tips of the sealing fins 240, 260, is worn away by the tips of the sealing fins during radial excursions of the moving blade shrouds 110. Deformation to the tips of the sealing fins 240, 260 is, thus, prevented or at least minimized, thereby preserving the effectiveness of the labyrinth seal 200.

Abradable materials suitable for the above purpose are, for example, thermal-sprayed coatings of various types, such as cermets. A well-known alternative is Feltmetal®, comprising metal fibre felts made from a variety of high temperature resistant alloys, the fibres in the felts being randomly interlocked by a sintering process. Feltmetal® is manufactured by Technetics, 1700 E. Int'l Speedway Blvd., DeLand, Fla. 32724 USA.

As shown more clearly in FIG. 6 for a single one of the static sealing fins 240, each of the static and moving sealing fins 240, 260 includes a vortex-producing flow recirculation surface which faces in the upstream direction relative to the flow of leakage air through the labyrinth seal 200. In the illustrated embodiment, each sealing fin 240, 260 has an upstream-facing surface 300 that includes a straight fin portion 320 projecting in a substantially radial direction from either the static casing 120 or the moving blade shroud 110 across the leakage flow path, and a distal portion 340 near its distal end, which is inclined towards the upstream direction of the leakage flow. In the particular variant shown, the inclined distal portion 340 is a concavely curved portion of the fin's upstream-facing surface 240, and comprises a vortex-producing flow recirculation surface, which extends over a distance comprising about 30% of the total length L of the fins measured between their tips and the surface from which they project. In other embodiments the concave curvature may extend over a distance in the range of about 20% to about 50% of the fin's length between its tip and the static or moving surface from which it projects.

As an example, take a fin with a length L of 10 mm between its point of attachment to the surface and its tip. If the curve in the distal portion of the upstream-facing surface 300 of the fin has a radius R of 4 mm, the curve will occupy about the last 3 mm of the fin adjacent the tip, measured in the radial direction.

Whereas in FIGS. 5 and 6 the concavely curved distal portion 340 of upstream-facing surface 300 of fins 240, 260 is shown as an arc of a circle with radius R, the skilled person will realize that the curve could alternatively be an arc of an ellipse or other conic section.

The concavely curved distal portion 340 of upstream-facing surface 300 may be approximated by a straight distal portion, inclined at an angle relative to the radial direction. This is illustrated in FIG. 7, where a fin 260A of length L has an upstream-facing surface 300A that includes a straight fin portion 320A projecting in a substantially radial direction from either the static casing 120 or the moving blade shroud 110 across the leakage flow path, and a straight distal portion 340A that is inclined at an angle 'B' to the radial direction to form a vortex-producing flow recirculation surface. Similarly to the concavely curved distal portion 340 in FIG. 2, angled distal portion 340A in FIG. 7 is inclined over a distance comprising about 30% of the total length L of the fin measured between its tip and the surface from which it projects, but in other embodiments the inclined portion may extend over a distance comprising between about 20% and about 50% of the fin's length between its tip and the surface from which it projects.

As an example, angle B in FIG. 7 may be in the range of about 10 degrees to about 60 degrees, preferably about 25 degrees to about 45 degrees, and if the length L of the fin is 10 mm, the inclined distal portion 340A of the upstream-facing surface 300A may occupy about the last 3 to 4 mm of the fin adjacent the tip, measured in the radial direction.

FIG. 8 illustrates a further alternative embodiment, which may be preferred from the aspect of enabling greater sealing efficiency. In this embodiment, the whole of the upstream-facing surface 300B of the fin is concavely curved, not merely the distal portion. In the particular case shown, the angle that the upstream-facing surface 300B makes to the radial direction gradually increases from zero at a point 320B where the fin projects from the static or moving surface, to a maximum angle B at the tip 340B of the fin. For example, the surface 300B could be elliptically, parabolically or hyperbolically curved. Again, angle B may be in the range of about 10 degrees to about 60 degrees, preferably about 25 degrees to about 45 degrees.

Returning to a consideration of FIG. 5, it should be noted that the complementary shapes of the vortex-producing flow recirculation surfaces 340 of the static and moving fins 240, 260 are effective to produce recirculating vortices 360 in the axially and circumferentially extending chambers 400 defined between successive static and moving fins 240, 260. The vortices make it difficult for the leakage flow to exit through the gaps between the tips of the fins and the adjacent static or moving surfaces, resulting in a reduced effective area and therefore a smaller coefficient of fluid discharge through the gaps. Furthermore the generated vortices contribute to a larger pressure drop across the fins and therefore reduced leakage. Note that an additional vortex 370 will be generated in the leakage flow before it enters the labyrinth by the flow recirculation surface of the most upstream fin 240, though this vortex may be weaker than the vortices produced in chambers 400. Although all the vortices 360, 370 are shown as rotating in the same direction, it is possible that vortices in adjacent chambers 400 may rotate in opposed directions, thereby further increasing the resistance of the labyrinth seal 200 to leakage flow.

As the number of static and moving sealing fins 240, 260 increases, the disruption and recirculation of the leakage fluid flowing along the fluid flow path also increases. The disruption of the leakage flow that is provided by the static and moving sealing fins 240, 260 of the labyrinth seal illustrated in FIG. 5 has been found to provide a reduction in leakage flow between the moving blade shrouds 110 and the static casing 120 of about 30% compared to conventional labyrinth seal designs such as that shown in FIG. 1 of EP 1001139 A1. The efficiency of an axial flow turbine including the labyrinth seal is thus appreciably improved.

Although the labyrinth seal illustrated in FIG. 5 includes a plurality of static sealing fins 240 and a plurality of moving sealing fins 260, it is possible that a labyrinth seal of this type could comprise only a single pair of fins, comprising a static sealing fin and a moving sealing fin.

Whereas FIG. 5 illustrates a presently preferred arrangement, in which each of the static fins 240 precedes in flow sequence a moving fin 260, it may also be possible to obtain a desirable increase in efficiency if the order of the static and moving fins is reversed, so that moving fins precede static fins. In FIG. 5, this would give an arrangement in which the first, third and fifth fins in streamwise sequence would be moving fins 240 and the second and fourth fins would be static fins 240.

Although the description above has focused on embodiments as applied to seals operating to control leakage between a static casing and moving blade shrouds, the skilled person will realize that embodiments falling within the scope of the appended claims could be applied to sealing between other types of moving and static parts, e.g., the moving part could be a turbine rotor shaft and the static part could be a static turbine diaphragm ring penetrated by the shaft.

The invention claimed is:

1. A labyrinth seal arranged to impede leakage flow though a gap between confronting surfaces of static and moving parts in an axial fluid flow turbomachine, the labyrinth seal comprising:
   a plurality of axially spaced and circumferentially extending sealing fins arranged in leakage flow series, the fins projecting across the gap from at least one of the confronting parts towards an opposing confronting part such that distal ends of the fins are in sealing proximity to the opposing confronting part;
   a plurality of chambers defined by successive fins in leakage flow series;
   each fin having an upstream-facing surface of which at least a distal portion thereof is inclined towards the upstream direction of the leakage flow to form a vortex-producing flow recirculation surface operative to deflect the leakage flow in the upstream direction and create recirculating vortices in the leakage flow within the chambers defined by successive fins,
   wherein one of the confronting surfaces of the static and moving parts is castellated and comprises at least one land and at least one relatively recessed portion, each land and each recessed portion being in sealing proximity to the distal end of a sealing fin and wherein successive sealing fins alternately comprise at least one first fin having a straight upstream-facing surface inclined towards the upstream direction and at least one second fin having an upstream-facing surface of which at least the distal portion is inclined towards the upstream direction, the distal end of each first fin being in sealing proximity to a land and the distal end of each second fin being in sealing proximity to a recessed portion,
   wherein the upstream-facing surface of the at least one second fin is variably curved concavely over its whole length, a maximum concavity being at its distal end.

2. A labyrinth seal according to claim 1, wherein the flow recirculation surface formed by the inclined distal portion of the at least one second fin is the concavely curved portion of the second fin's upstream-facing surface.

3. A labyrinth seal according to claim 1, wherein a most upstream fin of successive sealing fins is the most upstream at least one first fin whose distal end is in sealing proximity to a land, and an immediately succeeding fin to the most upstream fin is one of the at least one second fin whose distal end is in sealing proximity to a recessed surface portion.

4. A labyrinth seal according to claim 1, wherein a most upstream fin of successive sealing fins is the most upstream at least one second fin whose distal end is in sealing proximity to a recessed surface portion and an immediately succeeding fin to the most upstream fin is one of the at least one first fin whose distal end is in sealing proximity to a land.

5. A labyrinth seal according to claim 1, wherein the upstream-facing surface of each second fin comprises a radially extending portion projecting from the static or moving part and an inclined distal portion adjacent the fin's distal end.

6. A labyrinth seal according to claim 1, wherein the upstream-facing surface of each first sealing fin is inclined in the upstream direction at an angle of between 10 and 70 degrees away from the radial direction.

7. A labyrinth seal according to claim 6, wherein the upstream-facing surface of each first sealing fin is inclined in the upstream direction at an angle of 45 degrees away from the radial direction.

8. A labyrinth seal according to claim 1, wherein the at least one first and second fins are provided on the static part and the castellated surface is provided on the moving part.

9. A labyrinth seal according to claim 6, wherein the castellated surface comprises a radially outer surface of a turbine shroud ring in an axial flow turbine and the static part comprises a casing surrounding the turbine shroud ring.

10. A labyrinth seal according to claim 9, wherein abradable material is provided on the static part adjacent the distal ends of the moving sealing fins and/or on the moving part adjacent the distal ends of the static sealing fins.

11. A labyrinth seal according to claim 1, wherein the upstream facing surface is elliptically curved.

12. A labyrinth seal to claim 1, wherein the upstream facing surface is parabolically curved.

13. A labyrinth seal to claim 1, wherein the upstream facing surface is hyperbolically curved.

14. A turbomachine comprising a labyrinth seal arranged to impede leakage flow though a gap between confronting surfaces of static and moving parts in an axial fluid flow turbomachine, the labyrinth seal comprising:
   a plurality of axially spaced and circumferentially extending sealing fins arranged in leakage flow series, the fins projecting across the gap from at least one of the confronting parts towards an opposing confronting part such that distal ends of the fins are in sealing proximity to the opposing confronting part;
   a plurality of chambers defined by successive fins in leakage flow series;
   each fin having an upstream-facing surface of which at least a distal portion thereof is inclined towards the upstream direction of the leakage flow to form a vortex-producing flow recirculation surface operative to deflect the leakage flow in the upstream direction and create recirculating vortices in the leakage flow within the chambers defined by successive fins, wherein one of the confronting surfaces of the static moving parts is castellated and comprises at least one land and at least on relatively recessed portion, each land and each recessed portion being in sealing proximity to the distal end of a sealing fin and wherein successive sealing fins alternately comprise at least one first fin having a straight upstream-facing surface inclined towards the upstream direction and at least one second fin having an upstream-facing surface of which at least the distal portion is inclined towards the upstream direction, the distal end of each fin being in sealing proximity to a land and the distal end of each second fin being in sealing proximity to a recessed portion, wherein the upstream-facing surface of the at least one second fin is variably curved concavely over its whole length, a maximum concavity being at its distal end.

15. A labyrinth seal to claim 14, wherein the upstream facing surface is elliptically curved.

16. A labyrinth seal to claim 14, wherein the upstream facing surface is parabolically curved.

17. A labyrinth seal to claim 14, wherein the upstream facing surface is hyperbolically curved.

\* \* \* \* \*